Patented Sept. 9, 1952

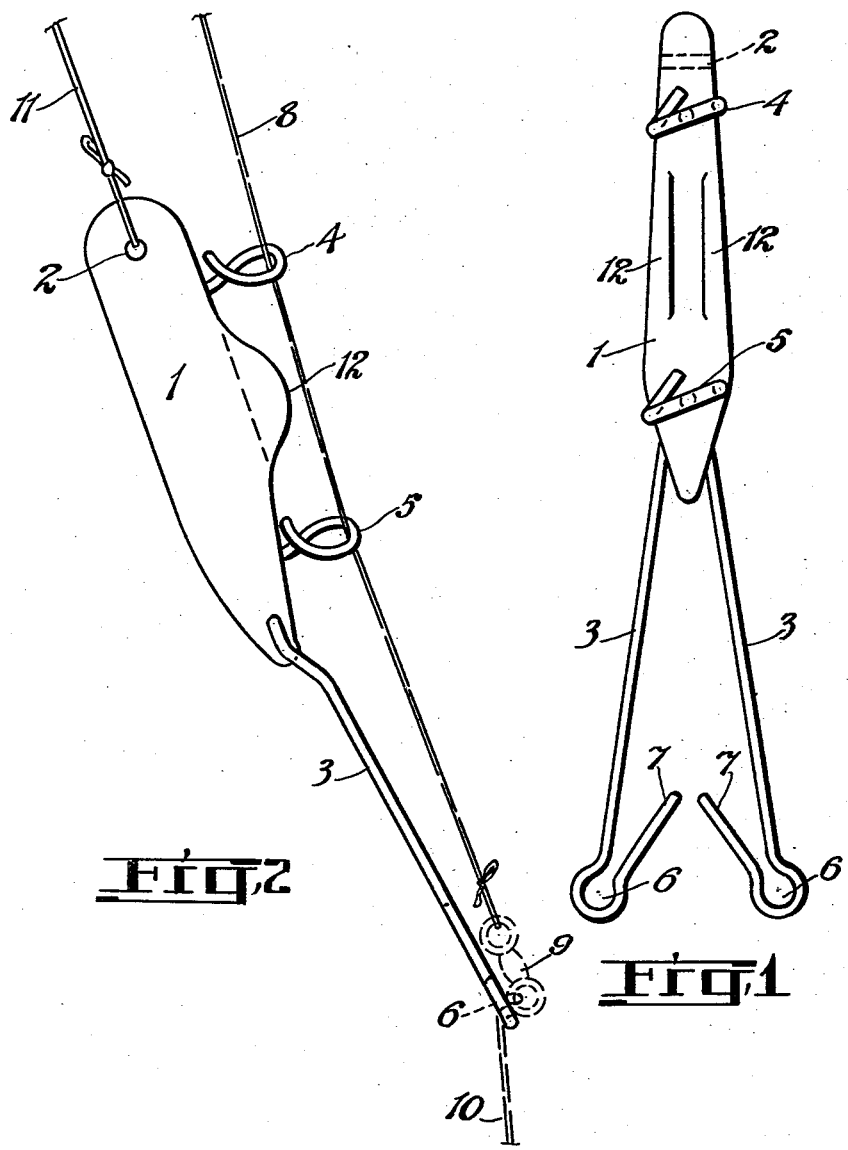

2,609,632

UNITED STATES PATENT OFFICE 2,609,632

TACKLE RETRIEVER

Hugh Davis, Windsor, Ontario, Canada

Application July 19, 1950, Serial No. 174,599
In Canada April 27, 1950

2 Claims. (Cl. 43—17.2)

This invention relates generally to devices used for retrieving tangled hidden or underwater tackle and particularly to devices used in recovering tangled fishing tackle of every description.

A considerable quantity of valuable fishing tackle is lost yearly by such tackle becoming entangled with plants and debris on river and lake beds, and very often the loss of such equipment involves, besides the cost, a loss in valuable time which could have otherwise been spent in pleasure or profit.

It is the object of this invention to provide a retrieving device such as described above, said device being of extremely simple and inexpensive construction, and being small and compact enough to enable it to be carried along with the usual fishing equipment, requiring no extra effort or room.

In drawings which illustrate embodiments of the invention,

Figure 1 is a front elevation of the invention,

Figure 2 is a side elevation of the invention, showing the method of its application.

In the drawing is shown the device which consists of a metal body 1 of somewhat streamlined design. This body which constitutes the weight of the device is preferably made of a heavy metal such as lead, for instance. It is not limited to any specific size, but should be made small enough for convenient storage and transportation along with other standard fishing equipment.

At its upper end, the body 1 is provided with a hole 2, which is used for the purpose of attaching a cord thereto. The lower end of the body 1 is pointed as shown in Fig. 2, and from each side of said pointed end extends a pronged heavy wire 3 which is bent into a narrow loop 6 which in turn has a short sloping extension 7. The extensions 7, 7, are arranged to point inwardly, and the ends of said extensions are spaced to provide free passage of the usual fishing cord between them.

The body 1 is further provided with two open heavy wire loops. One of said loops 4 is rigidly attached to the body 1 near its top, while the other and similar loop 5 is rigidly attached to the said body at the bottom. The said loops 4 and 5 are located on the centerline of the body 1, and a straight line passing through the said loops would pass centrally between the ends of the extensions 7, 7.

Two raised projections 12, 12 extend from the center of the body 1 to form a centrally located groove between them.

The method of operating the retrieving device is illustrated in Figure 2. In this view is shown a fishing line 8 having attached to the end thereof a fishing tackle parts of which are indicated by the numerals 9 and 10, 9 being a metal swivel ring which is normally too large to pass through any of the loops 6, and 10 being part of a gut or wire extending from the part 9, and being the part of the tackle which has become entangled. The actual entanglement is not shown in the drawings.

By reducing the size of the open loops 4 and 5, the groove formed between the projections 12, 12 can be used to guide the fishing line therein. Upon experimentation it has been found that a guide of this nature is, outside of special cases, not essential to the proper function of the retriever, the fishing line 8 is therefore shown in the drawing outside of the said groove.

To recover a tangled fishing tackle, a cord 11 is tied to the body 1 through the hole 2 and the retrieving device is attached to the fouled line 8 by passing the said line through the open wire loops 4 and 5. The retriever is then allowed to slide down the line 8 until it reaches the end of the said line or the vicinity of the entanglement. The line 8 slips through the extensions 7, 7, and sliding down one of the said extensions it lands in one of the said loops 6, 6. The said loops 6, 6, are large enough to permit the passage of the said fishing line but no other part of the tackle, so that upon the upward pull of the retriever one of the said loops holds firmly against the object 9. By further pulling on the cord 11, the entire tackle is freed from the entanglement, or the greater part of the said tackle is recovered and can be used again after minor repair. Other forms of fishing tackle are recovered in a similar manner, and it may occasionally be necessary to work the device up and down several times by means of the cord 11 to achieve that purpose.

It is obvious that various changes can be made in the general shape of the body part of the retriever by those skilled in the art, without departing from the scope of the invention.

I claim:

1. A tackle retrieving device comprising an elongated weighted body having a tapered lower end which terminates in a rounded point, a hole through the upper end of the said body for attaching a cord thereto, two spirally bent loops of wire mounted on the front of the said body one at each end thereof, and a pair of opposite but similarly bent wire arms one attached to each side of the said body at the lower end thereof in such a manner as to extend downwardly therefrom, said wire arms being symmetrically disposed on each side of the said rounded point and being formed with loops at their free ends which terminate in upwardly and inwardly directed extensions.

2. A retrieving device such as described in claim 1 having two longitudinally extending projections extending out from the front surface thereof, one on each side of the longitudinal center of said body, said projections forming a groove between them for guiding a fishing line therein during tackle retrieving operations.

HUGH DAVIS.

REFERENCES CITED

The following references are of record in the file of this patent:

UNITED STATES PATENTS

| Number | Name | Date |
| --- | --- | --- |
| 2,185,065 | Schmaltz | Dec. 26, 1939 |
| 2,399,298 | Sevegny | Apr. 30, 1946 |
| 2,479,448 | Woock | Aug. 16, 1949 |